No. 684,729. Patented Oct. 15, 1901.
E. F. SHAW.
SAW HANDLE.
(Application filed Aug. 14, 1900.)
(No Model.) 2 Sheets—Sheet 2.
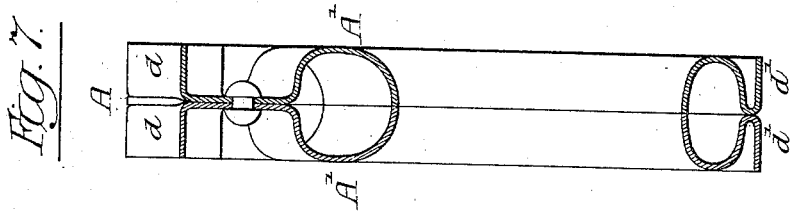
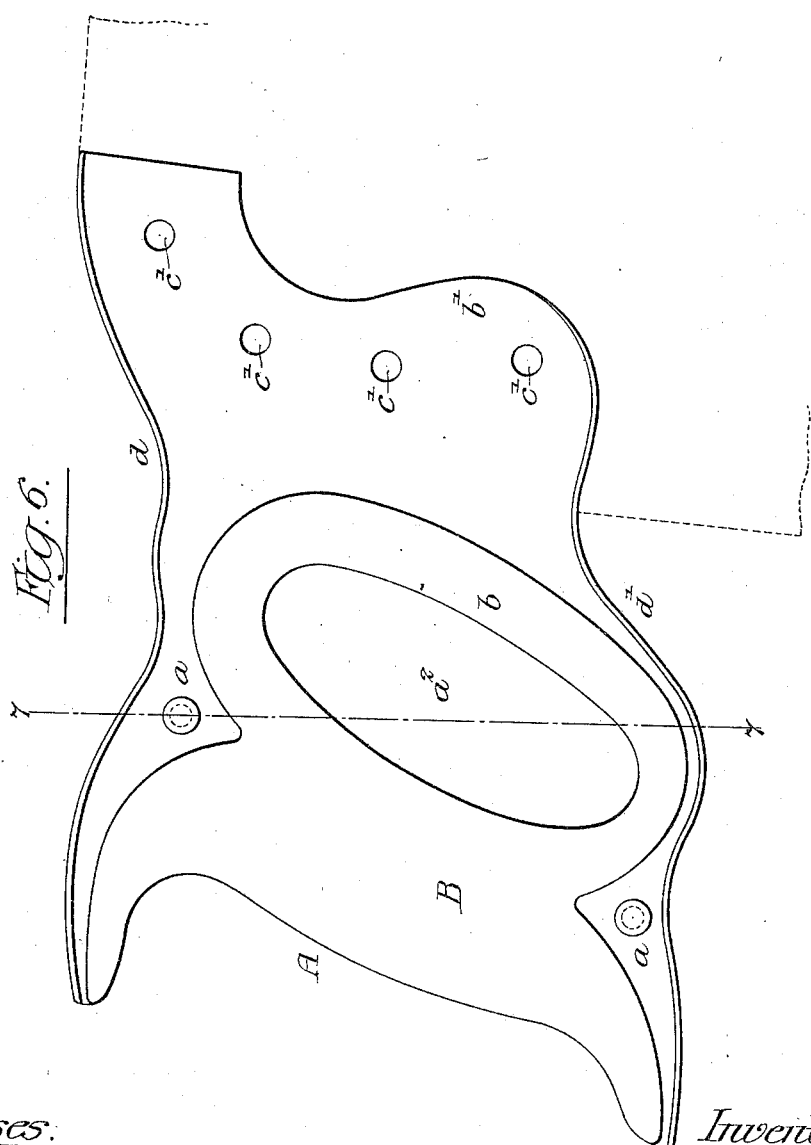
Witnesses:
Inventor:-
Edwin F. Shaw.-
by his Attorneys

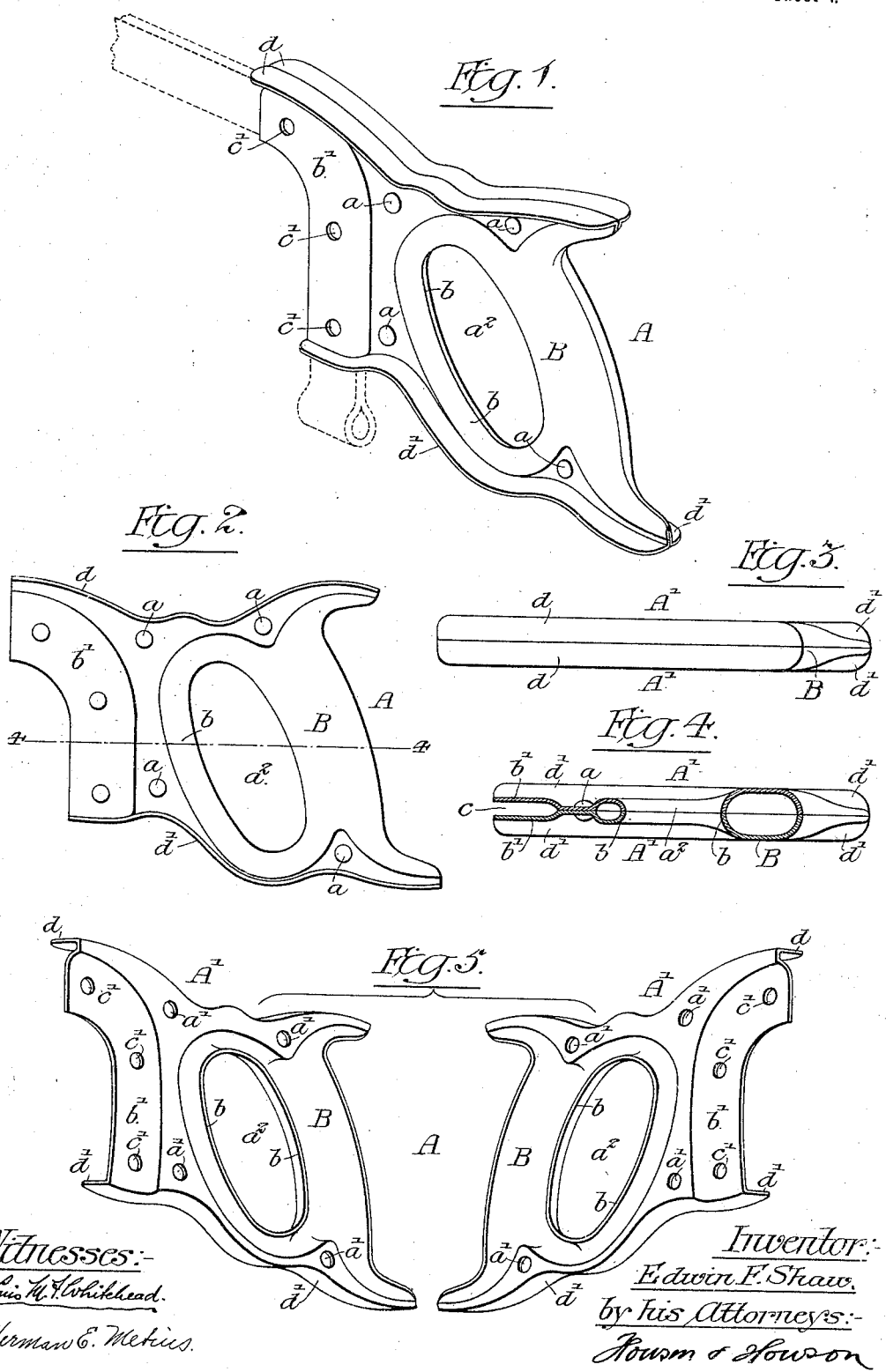

UNITED STATES PATENT OFFICE.

EDWIN F. SHAW, OF PHILADELPHIA, PENNSYLVANIA, ASSIGNOR TO HENRY DISSTON & SONS, INCORPORATED, OF PHILADELPHIA, PENNSYLVANIA, A CORPORATION OF PENNSYLVANIA.

SAW-HANDLE.

SPECIFICATION forming part of Letters Patent No. 684,729, dated October 15, 1901.

Application filed August 14, 1900. Serial No. 26,868. (No model.)

*To all whom it may concern:*

Be it known that I, EDWIN F. SHAW, a citizen of the United States, residing in Philadelphia, Pennsylvania, have invented certain Improvements in Saw-Handles, of which the following is a specification.

The object of my invention is to construct a substantial saw-handle which can be subjected to dampness and can be sterilized without danger of warping or splitting. This object I attain in the following manner, reference being had to the accompanying drawings, in which—

Figure 1 is a perspective view of my improved saw-handle made to be attached to a butcher's saw. Fig. 2 is a side view. Fig. 3 is a plan view. Fig. 4 is a sectional view on the line 4 4, Fig. 2. Fig. 5 is a detached perspective view illustrating the two sections of the handle. Fig. 6 is a view of my improved handle shaped to fit an ordinary wood-saw; and Fig. 7 is a section on the line 7 7, Fig. 6.

My improved saw-handle is preferably made in two sections secured together, each section being made of sheet metal, preferably steel, struck up into shape.

A is the saw-handle, made of two sections A' A', secured together in the present instance by rivets $a$. The rivets pass through perforations $a'$ in each of the sections, as clearly shown in Fig. 5 of the drawings. Each section A' has an eye $a^2$, forming the handhold B. A rib $b$ is preferably formed around the eye $a^2$, so as to give to the handle a smooth finish and at the same time strengthen the handle. The portion $b'$ of each section A' is pressed out, so that when the two sections are secured together they form a recess $c$ for the reception of the back of the saw or the saw-blade.

The handle shown in the drawings is a butcher's-saw handle and is shaped to be attached to the curved back of the saw, as illustrated by dotted lines in Fig. 1, although it will be understood that the invention can be applied to any form of saw. For instance, Figs. 6 and 7 illustrate a handle to be applied to an ordinary wood-saw. The sections are perforated at $c'$ for the screws or rivets which secure the handle to the saw.

In order to strengthen the handle and make it rigid, I form on each section A' flanges $d\ d'$, the flange $d$ extending from the upper edge of the section and the flange $d'$ extending from the lower edge of the section. When the two sections are secured together, as shown in Fig. 1, the two flanges project from the upper and lower edges of the handle at each side, making the handle perfectly rigid, so that it will be practically impossible to destroy it by rough usage. Furthermore, the flanges give a substantial finish to the handle, and at the same time the handle is comparatively light.

In some tropical countries the governments compel the butchers to sterilize all their butchering implements, and it has been found that the ordinary wooden handles of meat-saws soon crack and are destroyed by the sterilizing process, whereas by my improvement the entire saw can be sterilized without weakening the handle, and I have found that the handle constructed in accordance with my invention can be used for many other purposes where a saw is exposed to dampness and is subject to rough usage.

The design of the saw-handle will depend largely upon the saw to which it is to be attached.

I claim as my invention—

1. As a new article of manufacture, a saw-handle made of two struck-up sheet-metal sections, each section having one-half of the handhold and an outwardly-extending flange at the upper edge, and a flange to which the saw-blade is secured, substantially as described.

2. As a new article of manufacture, a saw-handle made of two struck-up sheet-metal sections, each section having one-half of the handhold and a flange to which the saw-blade is secured and outwardly-extending flanges along the upper and lower edges, substantially as described.

3. As a new article of manufacture, a saw-handle made up of two metallic sections secured together, each section having outwardly-extending flanges along its upper and lower edges, a perforated forward flange, and a portion pressed out to form one-half of the handhold, the two halves of the handle abutting at the points where they are secured together, substantially as described.

In testimony whereof I have signed my name to this specification in the presence of two subscribing witnesses.

EDWIN F. SHAW.

Witnesses:
 WILL. A. BARR,
 ELIAS H. WHITE.